(12) United States Patent
Eaton

(10) Patent No.: US 10,440,901 B2
(45) Date of Patent: Oct. 15, 2019

(54) PLANT SUPPORT

(71) Applicant: Roxanna Eaton, Thurmont, MD (US)

(72) Inventor: Roxanna Eaton, Thurmont, MD (US)

( * ) Notice: Subject to any disclaimer, the term of this patent is extended or adjusted under 35 U.S.C. 154(b) by 224 days.

(21) Appl. No.: 15/163,998

(22) Filed: May 25, 2016

(65) Prior Publication Data

US 2017/0105364 A1    Apr. 20, 2017

Related U.S. Application Data

(60) Provisional application No. 62/241,382, filed on Oct. 14, 2015.

(51) Int. Cl.
*A01G 9/12* (2006.01)

(52) U.S. Cl.
CPC .................... *A01G 9/122* (2013.01)

(58) Field of Classification Search
CPC .............. A01G 9/122; A01G 17/14
USPC .......................... 47/42, 43, 44, 47
See application file for complete search history.

(56) References Cited

U.S. PATENT DOCUMENTS

| | | | | |
|---|---|---|---|---|
| 1,080,758 A * | 12/1913 | Glascock | ............... | A01G 17/10 47/43 |
| 1,234,960 A * | 7/1917 | Talbert | ................... | A01G 17/10 47/43 |
| 1,634,004 A * | 6/1927 | Uhlik | ..................... | A01G 17/10 411/439 |
| 2,862,334 A * | 12/1958 | Sandvig | ................... | A01G 9/12 47/47 |
| 3,165,863 A | 1/1965 | Duran | | |
| 3,471,968 A * | 10/1969 | Letz | ....................... | A01G 9/122 248/125.3 |
| 3,516,200 A * | 6/1970 | Marin | .................. | A01G 23/099 248/354.5 |
| 4,222,198 A * | 9/1980 | Napolitano | ........... | A01G 17/12 47/43 |
| 4,381,621 A * | 5/1983 | Eby | ........................ | A47G 33/12 248/121 |
| 4,649,666 A * | 3/1987 | Ness | ...................... | A01G 17/12 47/43 |
| 4,738,050 A * | 4/1988 | Dickinson | .............. | A01G 17/12 47/43 |
| 4,779,375 A * | 10/1988 | Harder | ................... | A01G 17/04 47/47 |
| 4,971,282 A * | 11/1990 | Dickinson | .............. | A01G 17/08 248/224.8 |
| 5,052,148 A | 10/1991 | Sharon et al. | | |

(Continued)

*Primary Examiner* — Joshua D Huson
*Assistant Examiner* — Brady W Frazier
(74) *Attorney, Agent, or Firm* — Global Intellectual Property Agency, LLC; Daniel Boudwin

(57) ABSTRACT

A plant support for supporting a garden plant such as a flower, bush, tree, and the like. The plant support includes a first tube having an interior volume and a second tube slidably disposed within the interior volume of the first tube. A locking mechanism is disposed on the second tube and is configured to maintain the first tube in a particular position with respect to the second tube. A cable stop is disposed on the second tube. The plant support further includes a cable having a first end and a second end, each of the first and second end being removably secured to the cable stop, wherein the cable is securable around a portion of a plant. The plant support is configured to support a plant in an upright position to facilitate proper growth.

13 Claims, 3 Drawing Sheets

(56) References Cited

U.S. PATENT DOCUMENTS

| | | | | |
|---|---|---|---|---|
| 5,568,700 A * | 10/1996 | Veneziano | A01G 9/128 | 248/156 |
| 5,778,904 A * | 7/1998 | Elsner | A45D 8/34 | 132/275 |
| 6,026,548 A * | 2/2000 | Jackson | A43C 7/08 | 24/115 G |
| 6,076,807 A * | 6/2000 | Spence | E04H 17/1413 | 256/1 |
| 6,282,836 B1 * | 9/2001 | Goode | A01G 17/10 | 47/43 |
| 6,299,125 B1 * | 10/2001 | Zayeratabat | A01G 9/122 | 248/218.4 |
| 6,363,655 B1 * | 4/2002 | Napolitano | A01G 9/12 | 47/42 |
| 6,408,569 B1 * | 6/2002 | Obregon | A01G 9/124 | 47/42 |
| 6,484,535 B2 * | 11/2002 | Grosser-Samuels | A44C 5/209 | 24/115 G |
| 6,691,479 B1 * | 2/2004 | Tscharner | A01G 17/14 | 135/118 |
| 6,702,239 B2 * | 3/2004 | Boucher | A01G 9/122 | 248/125.8 |
| 6,925,754 B1 * | 8/2005 | Tearoe | A01G 9/12 | 172/371 |
| D615,391 S * | 5/2010 | Kawaguchi | F16G 11/101 | D8/383 |
| D633,378 S * | 3/2011 | Chan | B60J 7/104 | D8/383 |
| 8,061,366 B2 * | 11/2011 | Britton | A45D 8/36 | 132/200 |
| 8,122,659 B2 * | 2/2012 | Davidson | E04H 17/20 | 256/1 |
| 8,132,361 B1 * | 3/2012 | Poyas | A01G 17/12 | 248/218.4 |
| 8,336,252 B1 * | 12/2012 | Ammons | A01G 23/04 | 47/42 |
| D831,461 S * | 10/2018 | Jarrett | A01G 17/08 | D8/333 |
| 2004/0025426 A1 * | 2/2004 | Stefanutti | A01G 17/14 | 47/47 |
| 2005/0039395 A1 * | 2/2005 | Schwartz | A01G 9/122 | 47/47 |
| 2006/0150484 A1 * | 7/2006 | Morandi | A01G 9/128 | 47/44 |
| 2007/0084108 A1 | 4/2007 | Hertlein | | |
| 2008/0092439 A1 * | 4/2008 | Banks | A01G 9/122 | 47/47 |
| 2008/0110085 A1 * | 5/2008 | Merx | A01G 17/12 | 47/42 |
| 2008/0209802 A1 * | 9/2008 | Williams | A01G 9/122 | 47/47 |
| 2009/0031623 A1 * | 2/2009 | Decker | A01G 17/12 | 47/43 |
| 2009/0064473 A1 * | 3/2009 | Chan | A43C 7/00 | 24/712.5 |
| 2009/0077879 A1 * | 3/2009 | Lisciotti | A01G 17/14 | 47/47 |
| 2010/0043284 A1 * | 2/2010 | Smith | A01G 9/122 | 47/70 |
| 2011/0225779 A1 * | 9/2011 | Jones | B60J 7/104 | 24/301 |
| 2011/0277382 A1 * | 11/2011 | Davis | A01G 9/12 | 47/70 |
| 2012/0042498 A1 * | 2/2012 | Chu | F16G 11/101 | 29/453 |
| 2012/0159844 A1 | 6/2012 | Davis | | |
| 2013/0104346 A1 * | 5/2013 | Kawaguchi | F16G 11/101 | 24/115 G |

\* cited by examiner

PLANT SUPPORT

CROSS REFERENCE TO RELATED APPLICATIONS

This application claims the benefit of U.S. Provisional Application No. 62/241,382 filed on Oct. 14, 2015. The above identified patent application is herein incorporated by reference in its entirety to provide continuity of disclosure.

BACKGROUND OF THE INVENTION

The present invention relates to supports for use in gardening. More specifically, the present invention relates to plant supports configured to support a plant in an upright position.

Many individuals enjoy cultivating a garden. Gardens can contain a variety of plants such as trees, shrubs, vegetable plants, fruit plants, flowers, and the like. When cultivating a particular plant, it is often desirable to orient the plant in a particular direction to influence its appearance during growth. This can be done for aesthetic reasons in order to grow a plant having a pleasing appearance. Plants are also supported during early stages of growth in order to obtain a healthy, fully developed plant. For example, vegetable and fruit plants often produce a greater yield if the plants are supported and their growth directed upward from the time they are planted. It is therefore desirable to provide a device for supporting a plant in an upright position to influence its growth.

Devices have been disclosed in the prior art that relate to plant supports. These include devices that have been patented and published in patent application publications. These devices generally relate to plant supports such as trellises and rods and include, for example, U.S. Pat. No. 3,165,863, U.S. Published Patent Application Number 2007/0084108, U.S. Pat. Nos. 3,471,968, 5,052,148, and Published Patent Application Number 2012/0159844.

These prior art devices have several known drawbacks. For instance, these devices are typically designed for use with potted plants and are insufficient for supporting a full-sized plant during growth. Further, these devices fail to provide a supporting cable of adjustable length, and as such the devices cannot be adjusted for optimal use with different types of plants. It is therefore desirable to provide a plant support having a length-adjustable support cable for use with garden plants of varying sizes.

SUMMARY OF THE INVENTION

In view of the foregoing disadvantages inherent in the known types of plant supports now present in the prior art, the present invention provides a plant support wherein the same can be utilized for providing convenience for the user when supporting a growing plant in an upright position. The plant support includes a first tube having an interior volume and a second tube slidably disposed within the interior volume of the first tube. A locking mechanism is disposed on the second tube and is configured to maintain the first tube in a particular position with respect to the second tube. A cable stop disposed on the second tube. The plant support further includes a cable having a first end and a second end, each of the first and second end being removably secured to the cable stop, wherein the cable is securable around a portion of a plant.

One object of the present invention is to provide a novel and improved plant support that has none of the deficiencies of the prior art.

Another object of the present invention is to provide a plant support having a length adjustable cable for support plants of different sizes.

A further object of the present invention is to provide a plant support having a height adjustment mechanism for supporting a plant through all stages of growth.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
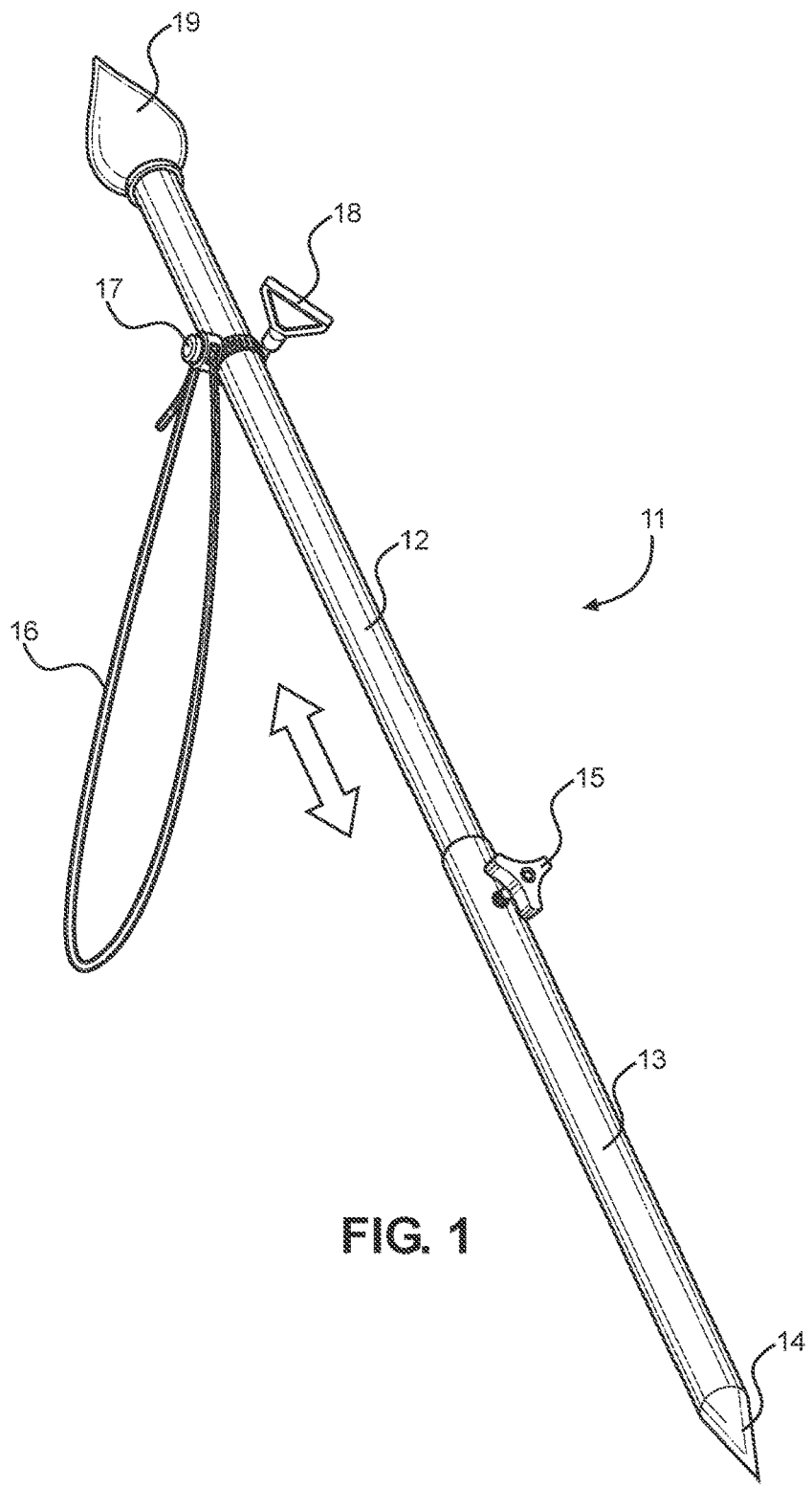
FIG. 1 shows a perspective view of one embodiment of a plant support according to the present invention.

Reference is made herein to the attached drawings. Like reference numerals are used throughout the drawings to depict like or similar elements of the plant support. For the purposes of presenting a brief and clear description of the present invention, the preferred embodiment will be discussed as used for supporting a plant in an upright position. The figures are intended for representative purposes only and should not be considered to be limiting in any respect.

Referring now to FIG. 1, there is shown a perspective view of one embodiment of a plant support according to the present invention. The plant support 11 generally comprises a first tube 13 having an interior volume (not visible). The first tube 13 is insertable into the ground. In alternate embodiments, the plant support may comprise more than two slidably engaging tubes. Multiple tubes may be utilized in a telescoping arrangement in order to provide greater precision to the length adjustment capabilities of the plant support. In the illustrated embodiment, the first tube 13 comprises a point 14 disposed on a lower end thereof. The point 14 engages with the ground when the tube 13 is inserted into the ground and provides for easier insertion.

The plant support 11 further comprises a second tube 12 that is disposed within the interior volume of the first tube 13 such that the second tube 12 slidably engages with the first tube 13. A locking mechanism 15 is disposed on the first tube 13 and is configured to maintain the second tube 12 at a particular position within the interior volume of the first tube 13. In the illustrated embodiment, the locking mechanism 15 comprises a set screw. The set screw engages with an aperture disposed on the first tube 13 via a threaded connection therewith. When tightened, the set screw frictionally engages with the second tube 12 in order to prevent movement thereof. In this way, the height of the plant support 11 may be adjusted to accommodate different types and sizes of plants. In alternate embodiments, other locking mechanisms may be utilized, such as a ball detent, rack and pin, or other suitable mechanism for maintaining the second tube 12 in a fixed position with respect to the first tube 13.

A cap 19 is disposed on an upper end of the second tube 12. In some embodiments, the cap 19 is removably securable to the upper end of the second tube 12 such that the cap 19 can be replaced or interchanged with a new or different cap. The shape and design of the cap 19 may vary according to user preference. In the illustrated embodiment, the cap 19 comprises a pointed upper portion and curved sidewalls. The pointed upper portion and curved sidewalls prevents small animals and birds from standing on top of the plant support 11. In this way, the plant support 11 is secured within the ground in a vertical orientation and will not be accidentally reoriented by an animal such as a squirrel or bird.

A cable stop 17 is connected to the second tube 12 via a ring clamp 18. The ring clamp 18 includes a handle and a collar, wherein the handle is configured to tighten or loosen the collar around the second tube 12. The ring clamp 18 may be positioned at any position along the second tube 12 according to user preference. A cable 16 is attached to the cable stop 17 such that the cable 16 is in a loop configuration. The cable 16 may be elastic or in alternate embodiments may be rigid. The circumference of the looped cable 16 may be adjusted via the cable stop 17. In this way, the cable 16 may be secured around plants having trunks and branches of varying thickness.

Figure 2:
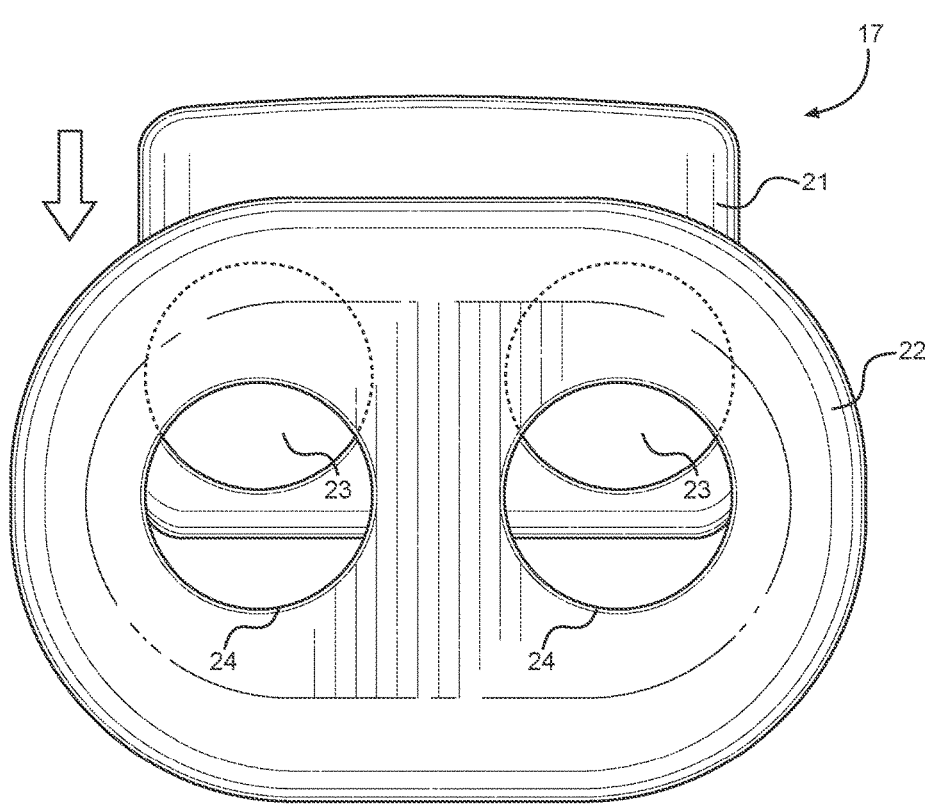
FIG. 2 shows a side view of the cable stop portion of one embodiment of a plant support according to the present invention.

Referring now to FIG. 2, there is shown a side view of the cable stop portion of one embodiment of a plant support according to the present invention. In the illustrated embodiment, the cable stop 17 comprises a body 22 and a push-button 21 in sliding engagement therewith. The body 22 comprises body apertures 24 and the push-button 21 comprises push-button apertures 23. The push-button 21 is spring biased away from the body 22 via a spring (not visible) disposed therein. When the push-button 21 is depressed, the push-button apertures 23 align with the body apertures 24.

When the apertures 23, 24 are aligned, a cable may be inserted therethrough. It is preferable that one end of a cable is inserted through one pair of apertures 23, 24 while an opposing end of the cable is inserted through the opposing apertures 23, 24. This arrangement maintains the cable in a loop configuration. When the ends of the cable are inserted into the aligned apertures 23, 24 and the push button 21 released, the cable ends are secured within the cable stop and the cable is maintained in a fixed loop configuration. The looped cable is securable around a plant in order to stabilize the plant and allow it to grow upward.

Figure 3:
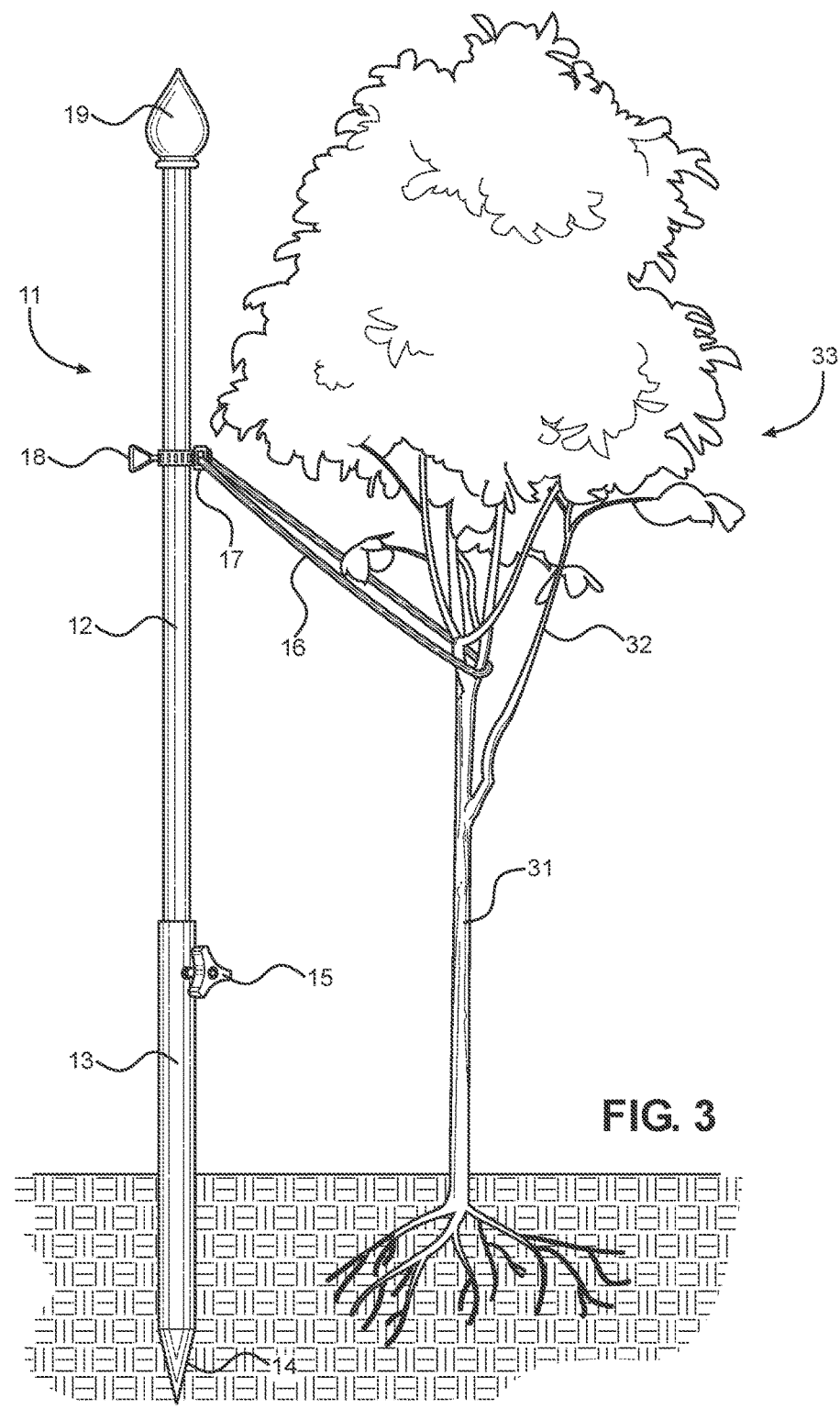
FIG. 3 shows a perspective view of one embodiment of a plant support according to the present invention in use to support a plant.

Referring now to FIG. 3, there is shown a perspective view of one embodiment of a plant support according to the present invention in use to support a plant. The plant support 11 is shown inserted into the ground in use to support a tree 33. The point 14 engages the ground and provides easier insertion therethrough. The first tube 13 is stationary when inserted into the ground and the second tube 12 may slide up or down to a desired position and secured in place via the locking mechanism 15 according to the height of the plant which may be supported. The height of the cap 19 may vary according to user preference. The exact positioning of the first tube 13 is preferably such that the plant support 11 remains in a rigid vertical position when supporting a tree 33.

The cable 16 is secured to the tree 33 in order to retain the tree 33 in a vertical position during growth. In alternate embodiments, multiple cables 16 may be utilized to support multiple plants. In this embodiment, multiple ring clamps 18 having cable stops 17 may be utilized to secure multiple cables 16 to different positions along the second tube 12. The different cables may be utilized to stabilize other plants, or may be utilized to provide additional stability to a single plant via multiple cables.

The cable 16 is shown secured to a trunk portion 31 of a tree 33. The cable supports the trunk 31 and prevents lateral movement thereof during growth. This allows the plant to grow upward in order to achieve a full, healthy appearance. Once the tree 33 has grown to a desired height such that the tree 33 no longer needs support to remain vertical, the cable 16 may be removed from the trunk portion 31 and secured around a smaller branch portion 32. In this way, individual branches 32 may be directed and supported during growth in order to provide a healthier, fuller looking plant.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plant support, consisting of:
   a first tube having an interior volume;
   a second tube slidably disposed within the interior volume of the first tube;
   a locking mechanism disposed on the first tube configured to maintain the second tube in a particular position with respect to the first tube;
   a cable stop disposed on the second tube via a ring clamp, wherein the ring clamp is slidable along the second tube, wherein the cable stop includes a first aperture therethrough and a second aperture therethrough;
   a cable having a first end and a second end, wherein each of the first and second ends are removably insertable through the first and second apertures of the cable stop;
   a cap having a lower portion, a middle portion, and an upper portion, wherein a diameter of the cap widens from the lower portion to the middle portion, and narrows from the middle portion to the upper portion, wherein the lower portion is secured to an upper portion of the second tube;
   wherein the cable is securable around a portion of a plant by insertion of the first and second ends of the cable through the first and second apertures of the cable stop, whereby a removable frictional engagement of the cable with the first and second apertures of the cable stop prevents slippage of the cable therethrough.

2. The plant support of claim 1, wherein the cap is removably secured to the upper portion of the second tube.

3. The plant support of claim 1, wherein the locking mechanism comprises a set screw that threadably engages with a threaded aperture disposed on the first tube, wherein the set screw frictionally engages with the second tube.

4. The plant support of claim 1, wherein the first tube further comprises a point disposed on a lower end thereof, wherein the point is insertable into a ground.

5. The plant support of claim 1, wherein the cable is removably secured by the cable stop in a loop configuration.

6. The plant support of claim 5, wherein a circumference of the loop is adjustable.

7. The plant support of claim 1, wherein the cable is elastic.

8. The plant support of claim 1, wherein the cable is stiff.

9. The plant support of claim 1, wherein the cap comprises a teardrop shape.

10. The plant support of claim 1, wherein the upper portion of the cap is closed.

11. The plant support of claim 1, wherein the first aperture of the cable stop is adjacent to the second aperture of the cable stop.

12. The plant support of claim 11, wherein the cable stop includes a push-button slidably engaged therewith, wherein the push button includes a first aperture and a second aperture adjacent to the first aperture of the push button, wherein the first aperture of the cable stop is alignable with the first aperture of the push button, wherein the second aperture of the cable stop is alignable with the second aperture of the push button.

13. The plant support of claim 12, wherein the push-button is spring biased away from a body of the cable stop to misalign the first and second apertures of the cable stop relative to the first and second apertures of the push button;

wherein if the first and second apertures of the cable stop are misaligned with the first and second apertures of the push button, the removable frictional engagement is applied to the cable to secure the cable in the cable stop;

wherein if a force is applied to the push-button to overcome the spring bias of the push-button, the push-button slides toward the body of the cable stop to align the first and second apertures of the cable stop with the first and second apertures of the push button, whereby the removable frictional engagement is not applied and the cable is slidable within the cable stop.

* * * * *